United States Patent
Yamamoto (10) Patent No.: US 7,369,346 B2
(45) Date of Patent: May 6, 2008

(54) METHOD FOR RETRACTING HEAD UPON INTERRUPTION OF POWER, AND DISK DRIVE EMPLOYING THE METHOD

(75) Inventor: Yoshinori Yamamoto, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 11/330,063

(22) Filed: Jan. 12, 2006

(65) Prior Publication Data

US 2006/0164749 A1 Jul. 27, 2006

(30) Foreign Application Priority Data

Jan. 25, 2005 (JP) ............................. 2005-017067

(51) Int. Cl.
*G11B 21/02* (2006.01)
(52) U.S. Cl. ....................................................... 360/75
(58) Field of Classification Search ................. 360/75, 360/78.06, 73.03, 256.3; 318/280; 359/296
See application file for complete search history.

(56) References Cited

U.S. PATENT DOCUMENTS

| | | | |
|---|---|---|---|
| 4,786,995 A * | 11/1988 | Stupeck et al. ................ 360/75 |
| 4,831,469 A | 5/1989 | Hanson et al. |
| 4,866,554 A * | 9/1989 | Stupeck et al. ........... 360/256.3 |
| 5,495,372 A | 2/1996 | Bahlmann et al. |
| 5,729,399 A * | 3/1998 | Albrecht et al. ............... 360/75 |
| 6,025,968 A | 2/2000 | Albrecht |
| 6,140,784 A * | 10/2000 | Mazda ........................ 318/280 |
| 6,141,173 A * | 10/2000 | Kitazaki et al. ............... 360/75 |
| 6,236,527 B1 * | 5/2001 | Uchiike et al. ................ 360/75 |
| 6,285,521 B1 * | 9/2001 | Hussein .................... 360/73.03 |
| 6,594,102 B1 * | 7/2003 | Kanda et al. .................. 360/75 |
| 6,747,832 B2 * | 6/2004 | Kisaka et al. ............ 360/73.03 |
| 6,765,746 B2 | 7/2004 | Kusumoto |
| 6,859,340 B2 * | 2/2005 | Brittner et al. ................ 360/75 |
| 6,937,429 B2 * | 8/2005 | Yoshida et al. .......... 360/78.06 |
| 7,046,424 B2 * | 5/2006 | Matsuda ...................... 359/296 |
| 7,133,242 B2 * | 11/2006 | Fujii et al. ..................... 360/75 |

FOREIGN PATENT DOCUMENTS

| | | |
|---|---|---|
| JP | 06-028764 | 2/1994 |
| JP | 2002-298530 | 10/2002 |

OTHER PUBLICATIONS

Australian Search Report dated Oct. 18, 2006 for Singapore Appln. No. 200507878-7.

* cited by examiner

*Primary Examiner*—Fred F. Tzeng
(74) *Attorney, Agent, or Firm*—Pillsbury Winthrop Shaw Pittman, LLP (57) ABSTRACT

A charge and discharge controller causes an capacitor to be charged by a power supply to a disk drive, and causes the capacitor to discharge when a power supply monitor detects the interruption of power to the disk drive. Upon detection of the interruption of power, an SPM controller supplies a current to an SPM using the discharge of the capacitor. Upon detection of the interruption of power, a retract controller supplies a current to a VCM using the discharge of the capacitor, thereby performing retract control for retracting the head to a ramp.

20 Claims, 8 Drawing Sheets

| Event (time) | Power supply monitor | SPM controller | Retract controller | Charge and discharge controller |
|---|---|---|---|---|
| Interruption of power (t11) | Power supply monitor signal OFF | Rated rotational speed maintained | OFF state | Control of charge of capacitor C1 |
| Completion of discharge of capacitor C1 (t12) | Power supply monitor signal ON | SPM spinning by capacitor C1 | 1st retract by capacitor C1 | Control of discharge of capacitor C1 |
| Completion of 1st retract (t13) | ↑ | Current generation by back EMF | Continuation of 1st retract by back EMF | Discharge completed state |
| | ↑ | (Current generation by back EMF) | 2nd retract by capacitor C2 | ↑ |

| Event (time) | Power supply monitor | SPM controller | Retract controller | Charge and discharge controller | Rotational speed monitor |
|---|---|---|---|---|---|
| | Power supply monitor signal OFF | Rated rotational speed maintained | OFF state | Control of charge of capacitor C1 | OFF state |
| Interruption of power (t21) | Power supply monitor signal ON | Current generation by back EMF | 1st retract by back EMF | OFF state | Monitor-rotational -speed detection signal OFF |
| Arrival at monitor rotational speed (t22) | ↑ | SPM spinning by capacitor C1 | Continuation of 1st retract by capacitor C1 | Control of discharge of capacitor C1 | Monitor-rotational -speed detection signal ON |
| Completion of 1st retract (t23) | ↑ | (Current generation by back EMF) | 2nd retract by capacitor C2 | Discharge completed state | ↑ |

F I G. 9

| 1st retract / SPM powering || 2nd retract |
| T*1 | T*2 | |
|---|---|---|
| C1 | Back EMF | C2 |
| C1 || C2 |
| C1 | Back EMF | Back EMF |
| C1 || Back EMF |
| Back EMF | C1 | C2 |
| Back EMF | C1 | Back EMF |

: Powering of SPM using C1

FIG. 10

METHOD FOR RETRACTING HEAD UPON INTERRUPTION OF POWER, AND DISK DRIVE EMPLOYING THE METHOD

CROSS-REFERENCE TO RELATED APPLICATIONS

This application is based upon and claims the benefit of priority from prior Japanese Patent Application No. 2005-017067, filed Jan. 25, 2005, the entire contents of which are incorporated herein by reference.

BACKGROUND OF THE INVENTION

1. Field of the Invention

The present invention relates to a disk drive with a head used to read and write data from and to a disk. More particularly, it relates to a method for retracting the head to a ramp provided near the disk, upon the interruption of power to the disk drive, and relates to the disk drive employing the method.

2. Description of the Related Art

As typical disk drives using a disk as a recording medium, hard disk drives (HDDs) are well known. HDDs comprise a head (magnetic head) used to read and write data from and to a disk, and a spindle motor used to rotate the disk. The head is supported by an actuator so that it can move radially over the disk. The actuator has a voice coil motor used to drive the actuator.

When the HDD is in a state in which the head is ready for a read or write operation, the head is positioned above the disk. More specifically, the head is floating over the disk in accordance with the rotation of the disk. When the head performs a read or write operation, it is moved to a target position on the disk by the actuator. In contrast, when the HDD is in the inoperative state, the head is retracted on a particular place (retraction area) called a ramp. The ramp is located outside the recording area of the disk.

If unintentional interruption of power occurs when the head is floating over the disk, it is strongly possible that the head will stick to the disk. To avoid this, various head retraction methods for automatically retracting the head to the ramp upon the interruption of power to the HDD have been proposed so far. Jpn. Pat. Appln. KOKAI Publication No. 2002-298530 discloses one (hereinafter referred to as "the prior art") of such retraction methods. The prior art is characterized in that the back electromotive force (back EMF) of the spindle motor and the charge accumulated in a capacitor are utilized for head retraction. The head retraction performed upon the interruption of power, disclosed in the prior art, is mainly realized by first and second retract operations. In the first retract operation, the voice coil motor is powered by the back EMF of the spindle motor. As a result, the head is moved to the position (retraction switching position) near the ramp. In the second retract operation, the voice coil motor is powered by the charge accumulated in the capacitor, whereby the head is moved to the ramp.

In accordance with the recent development of microfabrication of HDDs (microfabrication of disks), 1.8-inch HDDs, 1-inch HDDs and even 0.85-inch HDDs have come to be available. In accordance with the reduction of the HDD size, the torque (inertia) of the spindle motor inevitably reduces. Accordingly, when the power to the HDD is interrupted, the smaller the HDD (the smaller the diameter of the disk of the HDD), the more quickly the rotational speed of the spindle motor reduces. Therefore, in the prior art, it is possible that before the head reaches the ramp, the rotational speed of the spindle motor will become less than a value that is required to keep the floating level of the head constant. The lower the ambient temperature, the more conspicuous this tendency. In the prior art, when the supply of power is interrupted at, in particular, low temperature, it is difficult to prevent the head from contacting the disk.

BRIEF SUMMARY OF THE INVENTION

In accordance with an embodiment of the invention, there is provided a method of retracting a head to a ramp upon interruption of power to a disk drive. The head is used to read and write data from and to a disk when the disk is spun by a spindle motor. The ramp is located near the disk. The method comprises supplying a current to the spindle motor upon the interruption of the power to the disk drive, using discharge of a capacitor charged with the power, and performing retract control for retracting the head to the ramp upon the interruption of the power. The performing the retract control includes supplying a current to a voice coil motor which drives an actuator supporting the head, using the discharge of the capacitor.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
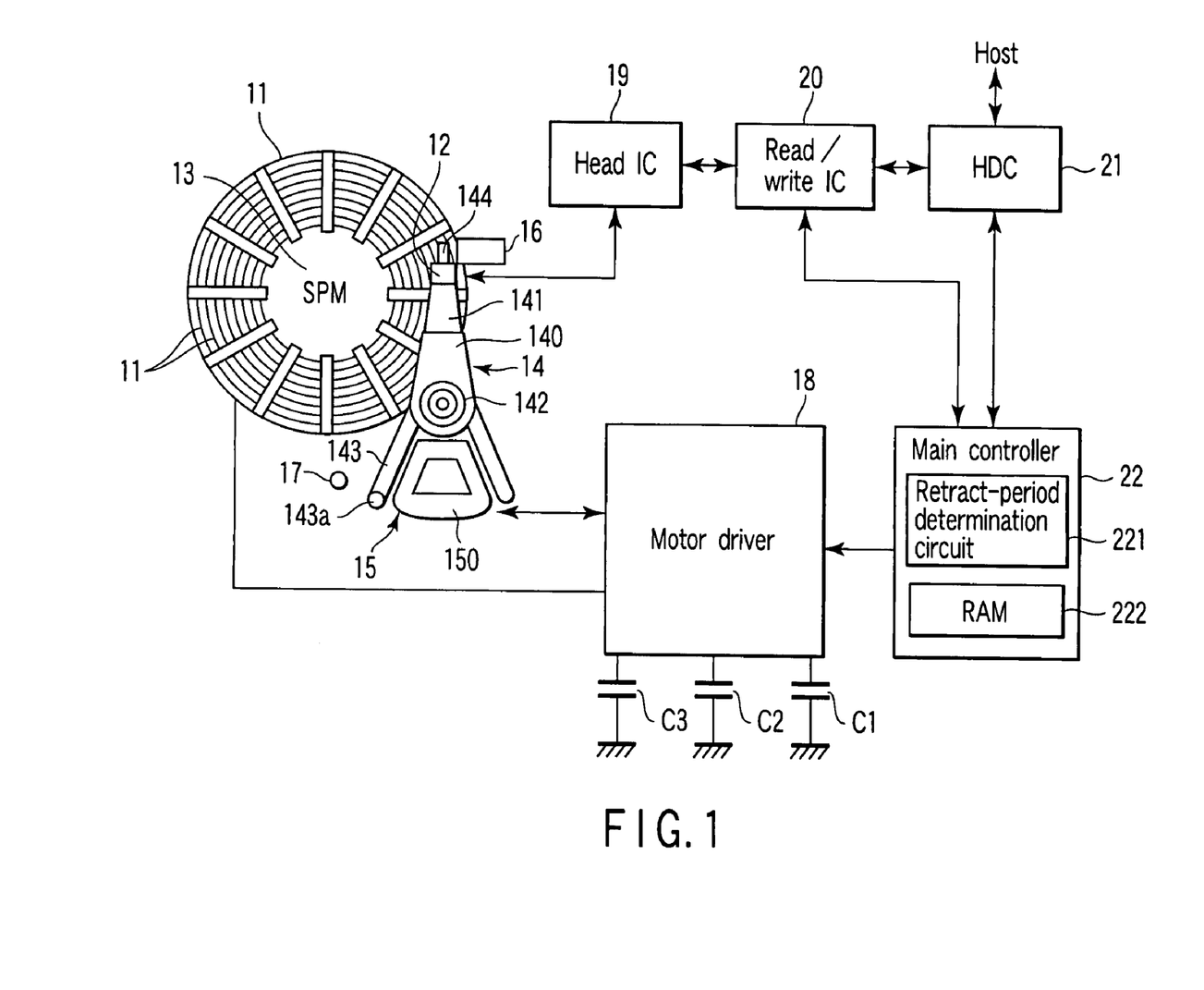
FIG. 1 is a block diagram illustrating the configuration of a hard disk drive (HDD) according to an embodiment of the invention.

An embodiment in which the present invention is applied to a hard disk drive (HDD) will be described with reference to the accompanying drawings. FIG. 1 is a block diagram illustrating the configuration of the HDD according to the embodiment of the invention. In FIG. 1, a disk (magnetic disk) 11 has two, i.e., upper and lower, surfaces. At least one of the disk surfaces serves as a recording surface for magnetically recording data. The disk 11 is, for example, a small disk medium with a diameter of 0.85 inches. A head (magnetic head) 12 is provided opposing the recording surface of the disk 11. The head 12 is used to read and write data from and to the disk 11. In the configuration of FIG. 1, it is assumed that the HDD has a single disk 11. However, the HDD may have a plurality of disks stacked on each other.

A large number of concentric tracks 110 are formed on the recording surface of the disk 11. Each track 110 includes servo information items pre-written (embedded) discretely at regular intervals. Each servo information item includes position information necessary for the control of positioning the head 12 to a target track. The position information includes a cylinder code indicating the position, on the disk 11, of the cylinder (track) on which each servo information item is written.

The dusk 11 is spun at high speed by a spindle motor (SPM) 13. The SPM 13 is, for example, a three-phase brushless motor. The head 12 is attached to an actuator (carriage) 14. More specifically, the head 12 is attached to a suspension 141 extending from an arm 140 that is incorporated in the actuator 14. The head 12 is moved radially over the disk 11 in accordance with the pivoting operation of the actuator 14. As a result, the head 12 is positioned on a target track. The actuator 14 has a voice coil motor (VCM) 15 for driving the actuator 14.

The disk 11 has inner and outer peripheries. A ramp 16 is provided, displaced from the recording surface of the disk 11, for example, near the outer periphery of the disk 11. Alternatively, the ramp 16 may be provided near the inner periphery of the disk 11. The ramp 16 provides a retraction area (parking area), displaced from the recording surface of the disk 11, for retracting the head 12 when the HDD is in the inoperative state. Actually, however, a tab 144 incorporated in the head 12 is placed on the ramp 16, instead of the head 12, and the ramp 16 is provided at a location on the movement route of the tab 144. To avoid a complicated expression, it may be described that the head 12 is retracted to the ramp 16. On the other hand, when the HDD is in the operative state, the head 12 exists over the disk 11.

Basically, the inoperative state of the HDD means a state in which the HDD is stopped. Depending upon the type of HDD, a plurality of power-saving states corresponding to power-saving levels may be defined. In an HDD of this type, the head 12 is retracted to the ramp 16 in s particular power-saving state that exceeds a preset power-saving level. In other words, in this type of HDD, the inoperative state includes a particular power-saving state, as well as the HDD-stop state. On the other hand, the operative state of the HDD means a state in which reading or writing of data from or to the disk 11 can be performed at once. This state may include power-saving states other than the above-mentioned particular power-saving state.

A through hole is formed in the substantially center of the actuator 14. An axis 142 is fitted in the through hole of the actuator 14 so that the actuator 14 can pivot about the axis 142. As a result, the head 12 can pivot along with the arm 140 and suspension 141, whereby it can move radially over the disk 11. The actuator 14 further comprises a, for example, V-shaped support frame 143 extending in the opposite direction to the arm 141. The support frame 143 has a voice coil 150 integrally embedded therein. The voice coil 150 is interposed between top and bottom yokes. The voice coil 150, the yokes and a permanent magnet (not shown) fixed to the bottom yoke provide the VCM 15.

The HDD of FIG. 1 includes an outer-periphery stopper 17. The outer-periphery stopper 17 is used to restrict the operation of the actuator 14 so that the head 12 does not jump to the outside of the ramp 16 when it is retracted to the retraction area of the ramp 16. To this end, the outer-periphery stopper 17 is placed at a location at which it is brought into contact with a distal end 143a of the V-shaped support frame 143 closer to the disk 11 when the head 12 is urged to jump to the outside of the ramp 16.

The SPM 13 and VCM 15 are powered by an SPM current and a VCM current supplied thereto from the motor driver 18, respectively. The motor driver 18 sequentially executes $1^{st}$ and $2^{nd}$ retract operations, described later, upon the interruption of power to the HDD. The motor driver 18 is connected to capacitors C1, C2 and C3. The capacitors C1, C2 and C3 are kept at the power supply voltage +V of the HDD in the HDD operative state.

The capacitor C1 is used as a power supply (SPM current supply) for powering the SPM 13, when the $1^{st}$ retract operation is performed upon the interruption of power to the HDD. Therefore, the capacitor C1 may be referred to as "the SPM-powering capacitor C1". The capacitor C1 is also used as a power supply (VCM current supply) for powering the VCM 15 during the $1^{st}$ retract operation. The $1^{st}$ retract operation means the operation of moving the head 12 in a certain direction to a position near the retract switching position for a $1^{st}$ retract period immediately after the interruption of power to the HDD. The retract switching position is set as, for example, a certain position near the ramp 16. In the embodiment, the retract switching position is a preset position over an outer peripheral portion of the disk 11.

The capacitor C2 is used as a power supply (current supply) for powering the VCM 15 during the $2^{nd}$ retract operation. Therefore, the capacitor C2 may be referred to as "the $2^{nd}$-retract capacitor C2". The $2^{nd}$ retract operation means the operation of retracting the head 12 to the ramp 16 after the $1^{st}$ retract operation is completed, i.e., after the $1^{st}$ retract period elapses from the start time of the $1^{st}$ retract operation.

The capacitor C3 is used as a backup power supply for the operation of the motor driver 18 itself, while the $1^{st}$ and $2^{nd}$ retract operations are executed. Therefore, the capacitor C3 may be referred to as "the backup capacitor C3". The operations of the motor driver 18 itself mean the operations (motor driving control) of, for example, an SPM controller 181 and retract controller 182, described later. Thus, the capacitor C3 is not used for motor powering operations (i.e., mechanical operations), unlike the capacitor C1 or C2. Accordingly, the electrostatic capacitance of the capacitor C3 may be sufficiently smaller than that of the capacitor C1 or C2.

The head 12 is connected to a head IC (head amplifier circuit) 19. The head IC 19 has a read amplifier for amplifying a read signal read by the head 12, and a write amplifier for converting write data into a write current. The head IC 19 is connected to a read/write IC (read/write circuit) 20. The read/write IC 20 is a signal processing device for performing various types of processing, such as analog-to-digital conversion of a read signal, encoding of write data and decoding of read data.

The read/write IC 20 is connected to a disk controller (HDC) 21 and main controller 22. The HDC 21 is connected to the main controller 22 and a host (host system). The host is a digital device, such as a personal computer, which utilizes the HDD of FIG. 1. The HDC 21 has an interface control function for controlling the reception of a command (e.g., a read/write command) from the host, and controlling data transfer between the host and the HDC 21. The HDC 21 also has a disk control function for controlling data transfer between the disk 11 and HDC 21.

The main controller 22 controls the entire HDD. Control by the main controller 22 include seek control for moving the head 12 to a target track designated by a command (read/write command) from the host. The main controller 22 includes a retract-period determination circuit 221 and random access memory (RAM) 222. Part of the memory area of the RAM 222 is used as a work area for the main controller 22.

The retract-period determination circuit 221 operates when the main controller 22 performs seek control. Each time a new head position is detected by the seek control of the main controller 22, the retract-period determination circuit 221 computes the $1^{st}$ retract period. The $1^{st}$ retract period indicates the period necessary to move the head 12 from the detected head position to the preset retract switching position. The $1^{st}$ retract period is set in the retract controller 182 of the motor driver IC 18 (see FIG. 2). The head position indicates the cylinder position of the head 12.

Figure 2:
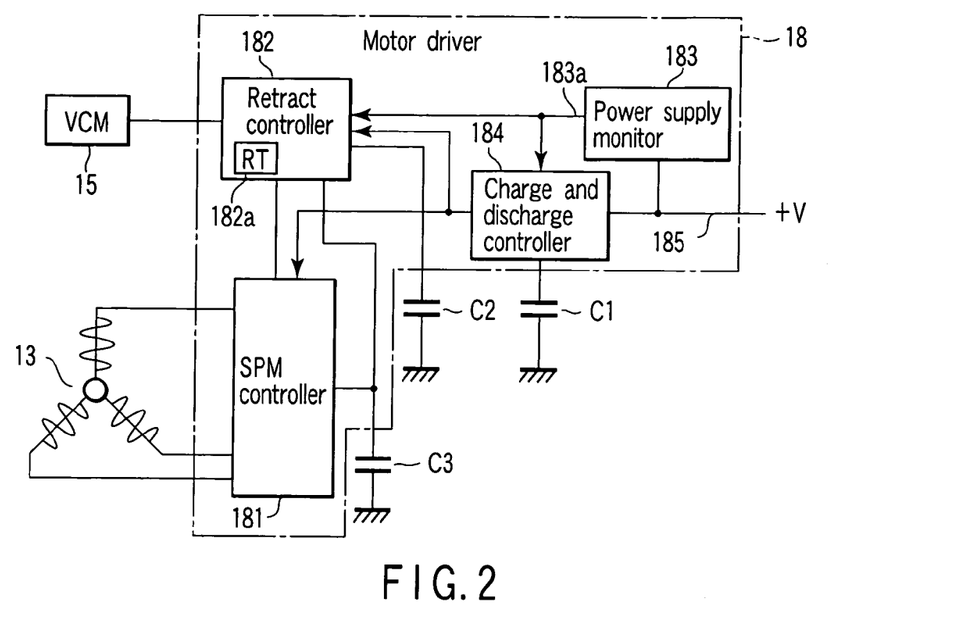
FIG. 2 is a block diagram illustrating, along with the peripheral circuit, the configuration of the motor driver 18 appearing in FIG. 1.

FIG. 2 shows the configuration of the motor driver 18, along with its peripheral circuit. As shown, the motor driver 18 comprises an SPM controller 181, retract controller 182, power supply monitor 183 and charge and discharge controller 184.

When the power supply of the HDD is in a normal or steady state, the SPM controller 181 is powered by the power supply voltage +V of the HDD applied via a power supply line 185. The SPM controller 181 performs control for rotating the SPM 13 at a rated speed. The SPM controller 181 is also powered by the charge of the backup capacitor C3 during the interruption of power to the HDD ($1^{st}$ retract operation). At the initial stage of the $1^{st}$ retract operation, the SPM controller 181 supplies, to the SPM 13 as an SPM current, the current (part of the current) supplied from the SPM-powering capacitor C1 under the control of the charge and discharge controller 184. After the discharge of the capacitor C1 is advanced during the $1^{st}$ retract operation, the SPM controller 181 supplies, to the VCM 15 as a VCM current, the current generated by the back EMF of the SPM 13. To this end, the SPM controller 181 contains a rectifier circuit (not shown) for rectifying the current generated by the back EMF of the SPM 13.

The retract controller 182 contains a retract timer (RT) 182a. Each time a new head position is detected, the $1^{st}$ retract period is set in the retract timer 182a by the main controller 22. In the normal state, the retract controller 182 is stopped. Only when the supply of power to the HDD is interrupted (only during the $1^{st}$ and $2^{nd}$ retract periods), the retract controller 182 is powered by the voltage caused by the electric charge accumulated in the backup capacitor C3. At the initial stage of the $1^{st}$ retract operation, the retract controller 182 supplies, to the VCM 15 as a VCM current, the current (part of the current) supplied from the SPM-powering capacitor C1 under the control of the charge and discharge controller 184. After the discharge of the capacitor C1 is finished during the $1^{st}$ retract operation, the retract controller 182 supplies, to the VCM 15 as a VCM current, the current generated by the back EMF of the SPM 13. Further, during the $2^{nd}$ retract period, the retract controller 182 supplies, to the VCM 15 as a VCM current, the current discharged from the $2^{nd}$-retract capacitor C2.

The power supply monitor 183 monitors the state of the power supply of the HDD to detect the interruption of the power supply. Specifically, the power supply monitor 183 detects the interruption of power when the power supply voltage +V of the HDD applied thereto via the power supply line 185 is lower than a predetermined voltage. Alternatively, the interruption of power may be detected when the power supply voltage +V of the HDD is lowered by a predetermined ratio or more. The power supply monitor 183 generates a power monitor signal 183a indicating the power monitoring result. The power monitor signal 183a is at low level (in the OFF state) when the power supply of the HDD is in the normal or steady state, and is at high level (in the ON state) when the supply of power is interrupted.

The charge and discharge controller 184 controls the charge and discharge of the capacitor C1. Namely, in the steady state of the power supply (in which the power monitor signal 183a is at low level), the charge and discharge controller 184 causes the capacitor C1 to be kept at the power supply voltage +V. In contrast, in the power-interrupted state (in which the power monitor signal 183a is at high level), the charge and discharge controller 184 causes the capacitor C1 to discharge.

FIG. 2 does not show a VCM controller. The VCM controller operates in the steady state of the power supply, and supplies the VCM 15 with a VCM current designated by the main controller 22. As well known, the VCM controller is used for seek control for moving the head to a target track, and for positioning control (tracking control) for positioning the head 12 at a target position on the target track.

Figure 3:
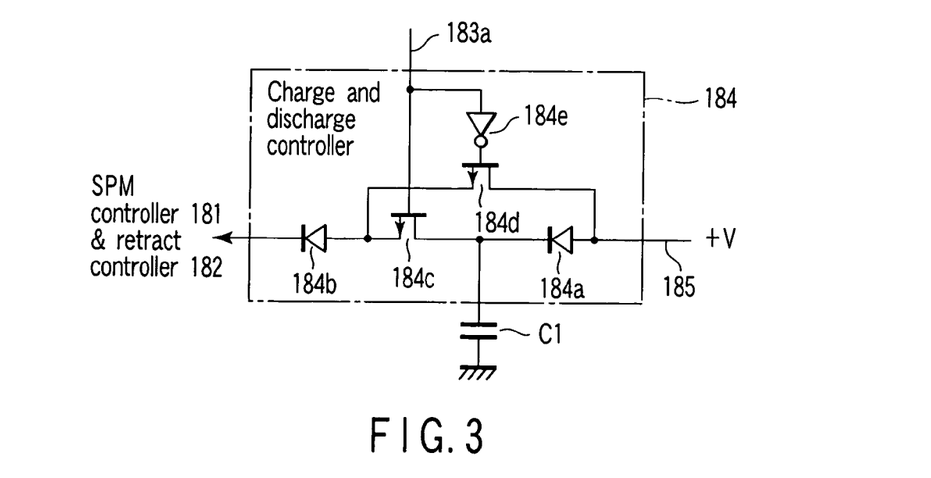
FIG. 3 is a circuit diagram illustrating the structure of the charge and discharge controller 184 appearing in FIG. 2.

FIG. 3 shows the structure of the charge and discharge controller 184. As shown, the charge and discharge controller 184 comprises diodes 184a and 184b, field effect transistors (FETs) 184c and 184d and inverter 184e. The FET 184c is used as a discharge start switch, and the FET 184d is used as a power supply switch. The anode of the diode 184a is connected to the power supply line 185, and the cathode of the diode 184a is connected to one end of the capacitor C1 and the source of the FET 184c. The other end of the capacitor C1 is grounded. The drain of the FET 184c is connected to the anode of the diode 184b, and the anode of the diode 184b is also connected to the drain of the FET 184d. The cathode of the diode 184b is connected to the SPM controller 181 and retract controller 182. The source of the FET 184d is connected to the power supply line 185. The gate of the FET 184c is supplied with the power monitor signal 183a from the power supply monitor 183. The power monitor signal 183a is also supplied to the input of the inverter 184e. The output of the inverter 184e is connected to the gate of the FET 184d.

Figure 4:
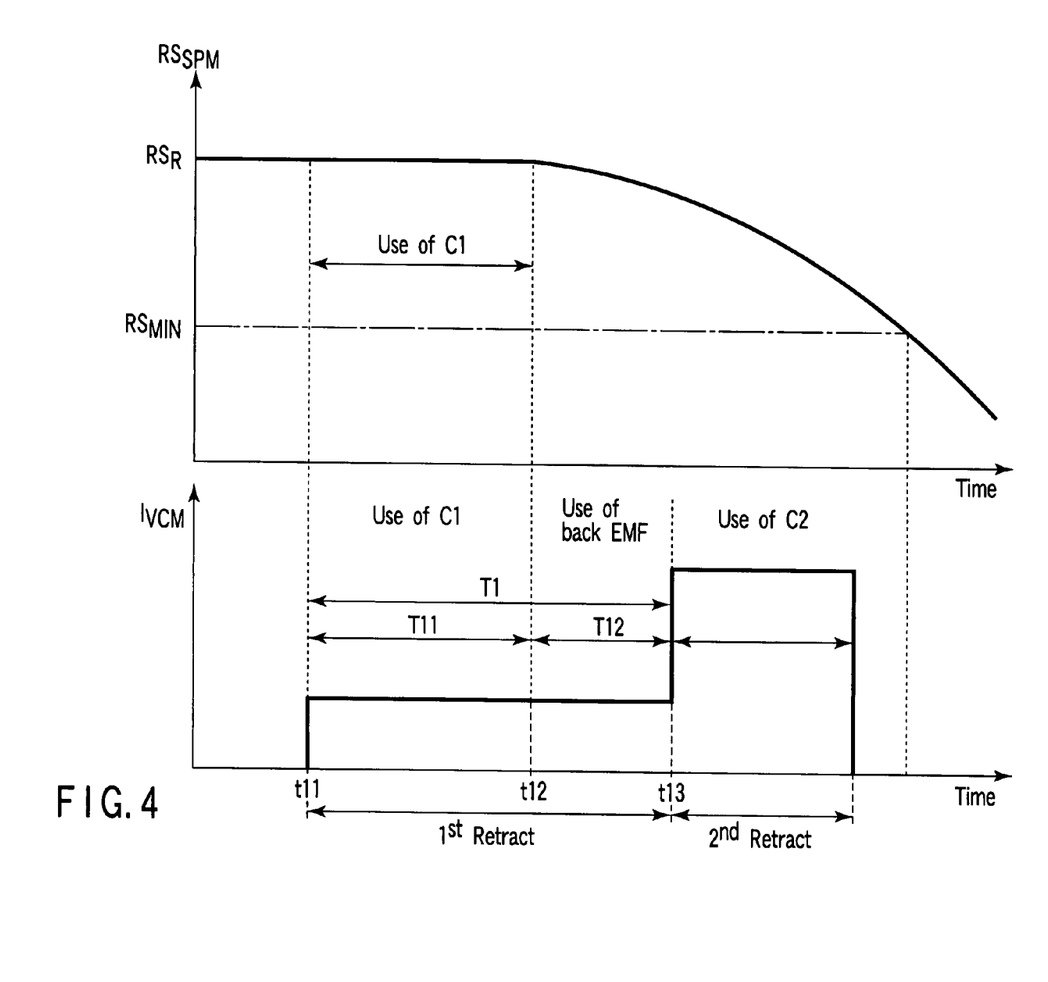
FIG. 4 is a view illustrating changes in the rotational speed $RS_{SPM}$ of a spindle motor (SPM) 13 and a VCM current $I_{VCM}$ with respect to the period ranging from the time when interruption of power occurs, to the time when head retraction has been finished, which are detected in the embodiment.
Figure 5:
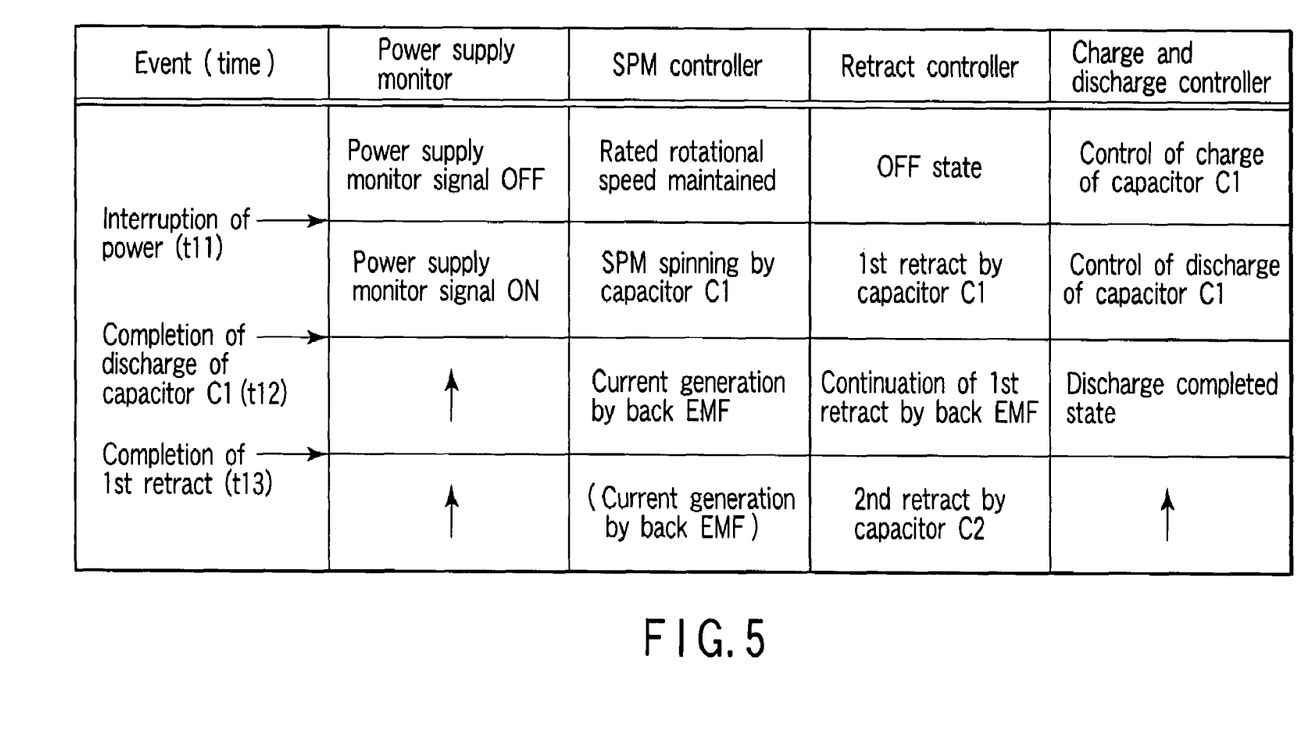
FIG. 5 is a view illustrating changes in the states of the circuits incorporated in the motor driver 18 in the embodiment.

Referring to FIGS. 4 and 5, the operation of the embodiment will be described. FIG. 4 is a view illustrating changes in the rotational speed $RS_{SPM}$ of the SPM 13 and a VCM current $I_{VCM}$ with respect to the period ranging from the time when interruption of power occurs, to the time when head retraction has been finished. FIG. 5 is a view illustrating changes in the states of the circuits incorporated in the motor driver 18. Assume here that the power supply voltage +V is normally applied to the HDD of FIG. 1. The power supply voltage +V is also applied via the power supply line 185 to the power supply monitor 183 and charge and discharge controller 184 of the motor driver 18 installed in the HDD of FIG. 1. The power supply monitor 183 keeps the power supply monitor signal 183a at low level when the power supply voltage +V applied via the power supply line 185 is in the normal or steady state.

When the power supply monitor signal 183a is at low level, the gate of the FET 184c of the charge and discharge controller 184 is at low level. In this state, the FET (discharge start switch) 184c is in the OFF state. The inverter 184e of the charge and discharge controller 184 inverts the level of the power supply monitor signal 183a. Accordingly, the output of the inverter 184e, i.e., the gate of the FET 184d of the charge and discharge controller 184, is at high level. This being so, while the power supply monitor signal 183a is at low level, the FET (power supply switch) 184d is in the ON state.

As described above, when the power supply monitor signal 183a is at low level, i.e., when the power supply voltage +V is in the normal or steady state, the power supply voltage +V is applied to the SPM controller 181 and retract controller 182 via the power supply line 185, FET 184d and diode 184b. When the power supply voltage +V is applied, the SPM controller 181 operates in accordance with the power supply voltage +V. As a result, the SPM controller 181 controls the SPM 13 to rotate it at a rated rotational speed $RS_R$. On the other hand, the retract controller 182 is kept inoperative when the power monitor signal 183a is at low level.

In the above-described steady state, the FET 184c is in the OFF state. Accordingly, the power supply voltage +V is applied by the diode 184e to the SPM-powering capacitor C1, therefore the capacitor C1 is kept at the voltage +V. Further, in the steady state, the power supply voltage +V is also applied to the $2^{nd}$-retract capacitor C2 and backup capacitor C3, and hence the capacitors C2 and C3 are kept at the voltage +V. FIG. 2 does not show power supply lines for applying the power supply voltage +V to the capacitors C2 and C3.

In the above state, assume that the supply of power to the HDD is interrupted at time t11 and the power supply voltage +V applied via the power supply line 185 is reduced to a value less than the preset value. At this time, the $1^{st}$ retract period is set in the retract timer 182a of the retract controller 182. The $1^{st}$ retract period indicates the period required to move the head 12 from the present cylinder position of the head 12 to the retract switching position. Assume that the $1^{st}$ retract period is T1.

When the power supply monitor 183 has detected reduction of the power supply voltage +V to a value less than the preset value, it determines that the interruption of power to the HDD is detected, thereby switching the power supply monitor signal 183a from low level (OFF state) to high level (ON state). At this time, in the charge and discharge controller 184, the gate of the FET 184c becomes high level, and the gate of the FET 184d becomes low level. Namely, the FET 184c is turned on, and the FET 184d is turned off. As a result, the application of the power supply voltage +V to the SPM controller 181 (and retract controller 182) via the FET 184d and diode 184b is interrupted. At the same time, accumulation of electricity in the capacitor C1 is stopped and the electricity charged in the capacitor C1 in the steady state is discharged. Thus, a current corresponding to the amount of the electricity discharged from the capacitor C1 is generated. This current is supplied to the SPM controller 181 and retract controller 182 via the FET 184c and diode 184b. At this time, the diode 184a connected between the capacitor C1 and the power supply line 185 prevents the current from reversely flowing from the capacitor C1 to the power supply line 185.

Upon the interruption of power to the HDD, the SPM controller 181 uses the capacitor C3 as a backup power supply, and starts to perform an operation (control operation) in accordance with the voltage of the capacitor C3. Specifically, the SPM controller 181 supplies the SPM 13 with the current from the capacitor C1. As a result, even if the supply of power to the HDD is interrupted at time t11, the rotational speed $RS_{SPM}$ of the SPM 13 is maintained at the rated speed $RS_R$ as far as possible (see FIG. 4), which prevents the floating level of the head 12 from becoming lower than a preset level.

On the other hand, the retract controller 182 is set in a $1^{st}$ retract mode when the supply of power to the HDD is interrupted and the power supply monitor signal 183a becomes high. In this state, the retract controller 182 uses the capacitor C3 as a backup power supply and starts an operation (control operation) in accordance with the charge of the capacitor C3. Specifically, the retract timer 182a of the retract controller 182 starts to measure time when the power supply monitor signal 183a is switched to high level. Further, the retract controller 182 starts to perform a $1^{st}$ retract operation ($1^{st}$ retract control operation). In the $1^{st}$ retract operation, the current from the capacitor C1 is supplied to the VCM 15 so that the actuator 14 retracts the head 12. The VCM 15 drives the actuator 14 in a direction in which the head 12 is retracted to the ramp 16.

At this time, the SPM 13 is supplied with the current from the capacitor C1 by the SPM controller 181, as is described above. As a result, the rotational speed $RS_{SPM}$ of the SPM 13 is maintained at the rated speed $RS_R$. In this state, at least at the initial stage of the $1^{st}$ retract operation, the head 12 cannot be retracted using the back EMF, unlike the prior art. Therefore, the embodiment employs a structure in which the current resulting from the discharge of the capacitor C1 is supplied to the VCM 15 by the retract controller 182. This structure enables the retract operation of retracting the head 12 to be performed even if the SPM 13 is spun by the current resulting from the discharge of the capacitor C1.

When the discharge of the capacitor C1 is started upon the interruption of power to the HDD, i.e., at time t11, the potential of the capacitor C1 (i.e., the potential at the cathode of the diode 184a) gradually decreases with time. Assume that at time t12 later than time t11 by period T11 (T11<T1), the potential at the capacitor C1 is reduced to a value less than the potential generated by the back EMF of the SPM 13. At this time, the discharge of the capacitor C1 is finished, whereby the supply, by the charge and discharge controller 184, of a current from the capacitor C1 to the SPM controller 181 and retract controller 182 is stopped. Instead, from time t12, the current generated by the back EMF of the SPM 13 is supplied to the retract controller 182 via the rectifying circuit of the SPM controller 181.

As described above, in the embodiment, when the discharge of the capacitor C1 is advanced, and the potential of the capacitor C1 is reduced to a value lower than the potential generated by the back EMF of the SPM 13, the current supply source (VCM current source) for powering the VCM 15 is automatically switched from the capacitor C1 to the back EMF of the SPM 13. Namely, the embodiment does not require any special mechanism to switch the use of the VCM current source from the electricity discharged from the capacitor C1 to the back EMF of the SPM 13.

The retract controller 182 continues the $1^{st}$ retract operation even after time t12, by supplying the VCM 15 with the current generated by the back EMF of the SPM 13. The diode 184b is provided across the path for guiding a current from the capacitor C1 to the SPM controller 181 (and retract controller 182). The diode 184b prevents the current generated by the back EMF of the SPM 13 from reversely flowing to the capacitor C1.

Assume here that $1^{st}$ retract period T1 has elapsed from time t11. Namely, assume that the retract timer 182a of the retract controller 182 has measured period T1. In this case, the timer 182a generate a timeout. Upon generation of the timeout, the retract controller 182 is switched from the $1^{st}$ retract mode to the $2^{nd}$ retract mode. Assume that this switching is performed at time t13. At time t13, i.e., when the $1^{st}$ retract operation is completed, the head 12 is positioned near the retract switching position as a result of the $1^{st}$ retract operation.

In the $2^{nd}$ retract mode, the retract controller 182 executes a $2^{nd}$ retract operation ($2^{nd}$ retract control operation) using the capacitor C2 as the VCM current source. Specifically, the retract controller 182 causes the capacitor C2 to discharge, and supplies the VCM 15 with the current resulting from the discharge, the current serving as a VCM current. As a result, the retract controller 182 retracts the head 12 from the position near the retract switching position to the ramp 16. When the head 12 is retracted to the retract area of the ramp 16, the tip 143a of the support frame 143 of the actuator 14 is latched by the outer-periphery stopper 17.

As described above, in the embodiment, during period T11 ranging from time t11 to time 12 and included in period T1 (the $1^{st}$ retract mode period) that ranges from time t11 to time t13, the SPM 13 is spun and the $1^{st}$ retract operation is performed, using the current supplied from the capacitor C1. Period T1 is the $1^{st}$ retract mode period, and period T11 is the beginning portion of the $1^{st}$ retract mode period. Assume here that the period ranging from time t12 to time t13 is T12 (T12=T1−T11). Period T12 is the remaining period of the $1^{st}$ retract mode period. In the embodiment, during period T12, the $1^{st}$ retract operation is continued by the current generated by the back EMF of the SPM 13. From t13, the $2^{nd}$ retract operation is performed using the current supplied from the $2^{nd}$ retract capacitor C2.

In the embodiment, from time t12, the spin of the SPM 13 is continued using the inertia of the spin. Namely, unlike the prior art, the SPM 13 continues its spin from time t12 later than time t11 by period T11, using the inertia. As a result, the period required for the rotational speed $RS_{SPM}$ of the SPM 13 to be reduced to a lower limit value (lower-limit rotational speed) $RS_{MIN}$ that is necessary for maintaining the floating level of the head 12 at a preset level can be made longer by substantially T11 than in the prior art.

Therefore, in the above embodiment, the rotational speed $RS_{SPM}$ of the SPM 13 is prevented from being reduced to the lower-limit rotational speed $RS_{MIN}$ before the head retract operation (the $2^{nd}$ retract operation following the $1^{st}$ retract operation) performed upon interruption of power is completed, regardless of whether the SPM 13 has a small inertia (torque), or regardless of whether the ambient temperature is low. As a result, the head 12 is prevented from contacting the disk 11 during the retract operation, and reliably retracted to the ramp 16. It is preferable to design the electrostatic capacitance of the capacitor C1 in accordance with the sum of first and second capacitances. The first capacitance is the capacitance necessary to maintain the lower-limit rotational speed $RS_{MIN}$ at the lowest temperature at which the HDD operation is guaranteed by the specification, until the head retraction is completed. The lower-limit rotational speed $RS_{MIN}$ is, as mentioned above, the lowest rotational speed $RS_{SPM}$ of the SPM 13 necessary to guarantee the floating level of the head 12. Further, the second capacitance is the capacitance necessary to supply the VCM 15 with the current required for the retract operation ($2^{nd}$ retract operation) and generated by the back EMF of the SPM 13.

If the capacitor C1 has a greater electrostatic capacitance than that employed in the above embodiment, it is possible to use the capacitor C1 for powering both the SPM 13 and VCM 15 till the end of the $1^{st}$ retract mode (i.e., till time t13). In this case, also during period T12 ranging from time t12 to time t13, the $1^{st}$ retract operation using the capacitor C1 is continued. Namely, the $1^{st}$ retract operation using the back EMF of the SPM 13 can be omitted.

In the embodiment, it is assumed that the outer-periphery stopper 17 is formed of a magnet latch. In this case, when the head 12 is retracted to the ramp 16, the tip 143a of the support frame 143 of the actuator 14 is latched by the magnetic force of the outer-periphery stopper 17. Therefore, if the magnet latch is used as the stopper 17, the VCM current necessary for the $2^{nd}$ retract operation can be reduced, compared to the case where no magnetic latch is used as the stopper 17. In this case, the $1^{st}$ retract operation using the capacitor C1 can be also continued during period T12 ranging from time t12 to time t13. Furthermore, from time t13, the $2^{nd}$ retract operation can also be executed using the back EMF of the SPM 13. In this case, the $2^{nd}$ retract capacitor C2 is not necessary.

In the embodiment, it is assumed that the retract switching position is the preset position over the outer periphery of the disk 11. However, the retract switching position may be another position, for example, a preset position on the retract area of the ramp 16. To this end, it is sufficient if the capacitor C1 has a greater capacitance than that employed in the embodiment. In this case, period T11 can be set longer, without reducing the rotational speed $RS_{SPM}$ of the SPM 13 to the lower-limit rotational speed $RS_{MIN}$ or less. As a result, at time t13 later than time t11 by period T1 (=T11+T12), the head 12 can be made to reach the retract area of the ramp 16, or a position near the retract area. When the head 12 is placed on the retract area of the ramp 16 or the position near it, the tip 143a of the support frame 143 of the actuator 14 is positioned near the outer-periphery stopper 17. At this time, if a current is supplied to the VCM 15 by the $2^{nd}$ retract operation, the support frame 143 of the actuator 14 is pressed against the outer-periphery stopper 17, with the had 12 placed on the ramp 16. In this state, the $2^{nd}$ retract operation can be performed, using the back EMF of the SPM 13 instead of the capacitor C2.

[Modification]

A modification of the embodiment will now be described. The modification is characterized in that the VCM current sources used in the initial stage and remaining stage of the $1^{st}$ retract operation are opposite to those used in the embodiment. More specifically, in the modification, the back EMF of the SPM 13 is used as a VCM current source at the initial stage of the $1^{st}$ retract operation, and the capacitor C1 is used as another VCM current source during the remaining stage of the $1^{st}$ retract operation.

Figure 6:
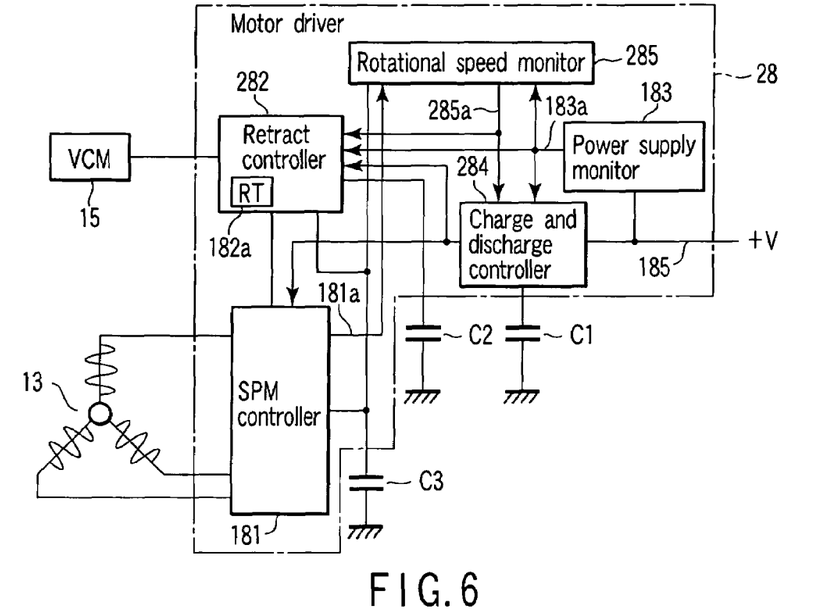
FIG. 6 is a block diagram illustrating, along with the peripheral circuit, the configuration of a motor driver 28 according to a modification of the embodiment.

FIG. 6 illustrates, along with the peripheral circuit, the configuration of a motor driver 28 according to the modification of the embodiment. The modification differs from the embodiment in that the motor driver 28 shown in FIG. 6 is used instead of the motor driver 18 shown in FIG. 2. In FIGS. 2 and 6, like elements are denoted by like reference numerals.

As shown in FIG. 6, the motor driver 28 comprises an SPM controller 181, retract controller 282, power supply monitor 183, charge and discharge controller 284 and rotational speed monitor 285. The retract controller 282 and charge and discharge controller 284 correspond to the retract controller 182 and charge and discharge controller 184 shown in FIG. 2, respectively.

The retract controller 282 differs from the retract controller 182 in the following two points. Firstly, in the initial stage of the $1^{st}$ retract mode, the retract controller 282 supplies, to the VCM 15 as a VCM current, the current supplied from the SPM controller 182 and generated by the back EMF of the SPM 13. Secondly, when the rotational speed $RS_{SPM}$ of the SPM 13 is reduced to a particular rotational speed called a monitor rotational speed $RS_M$, the retract controller 282 supplies, to the VCM 15 as another VCM current, the current supplied from the capacitor C1 under the control of the charge and discharge controller 284. The monitor rotational speed $RS_M$ is set equal to or lower than the rated rotational speed $RS_R$, and higher than the lower-limit rotational speed $RS_{MIN}$ ($RS_{MIN} < RS_M \leq RS_R$). The retract controller 282 contains a retract timer 182a, like the retract controller 182.

The charge and discharge controller 284 differs from the charge and discharge controller 184 in the discharge start time of the capacitor C1. Specifically, the charge and discharge controller 284 causes the capacitor C1 to start to discharge not upon the interruption of power, but when the rotational speed $RS_{SPM}$ of the SPM 13 is reduced to the monitor rotational speed $RS_M$. As a result, the SPM controller 181 supplies, to the SPM 13 as an SPM current, the current supplied from the capacitor C1 under the control of the charge and discharge controller 284, after the rotational speed $RS_{SPM}$ of the SPM 13 is reduced to the monitor rotational speed $RS_M$.

The rotational speed monitor 285 monitors a rotational speed signal 181a generated by the SPM controller 181 when the power supply monitor signal 183a is at high level. The rotational speed signal 181a is a frequency signal proportional to the rotational speed $RS_{SPM}$ of the SPM 13 and formed of a sequence of pulses that appear at the cycles determined from the rotational speed $RS_{SPM}$. The rotational speed monitor 285 monitors the rotational speed signal 181a to monitor the rotational speed $RS_{SPM}$ of the SPM 13. The rotational speed monitor 285 outputs a high-level monitor rotational-speed detection signal (particular rotational-speed detection signal) 285a when the rotational speed $RS_{SPM}$ of the SPM 13 is reduced to the monitor rotational speed $RS_M$. The detection signal 285a is sent to the retract controller 282 and charge and discharge controller 284.

Figure 7:
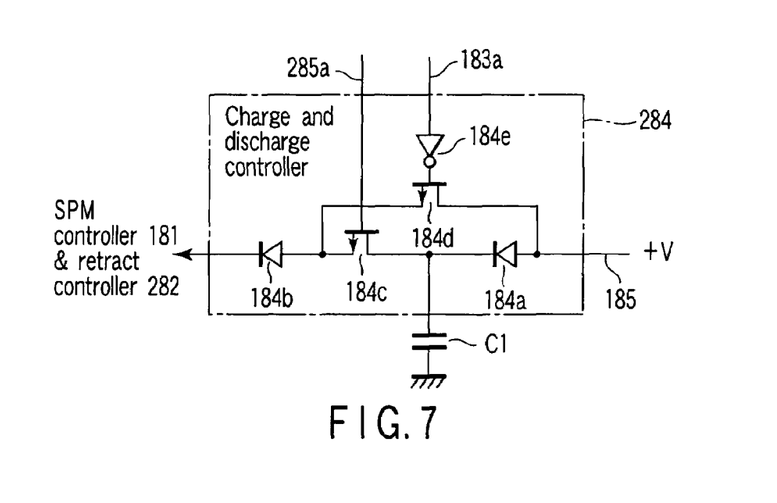
FIG. 7 is a circuit diagram illustrating the structure of the charge and discharge controller 284 appearing in FIG. 6.

FIG. 7 shows the structure of the charge and discharge controller 284. In FIG. 7, elements similar to those of FIG. 3 are denoted by corresponding reference numerals. The charge and discharge controller 284 differs from the charge and discharge controller 184 in that in the former, the monitor rotational-speed detection signal 285a is supplied to the gate of the FET 184c, instead of the power supply monitor signal 183a.

Figure 8:
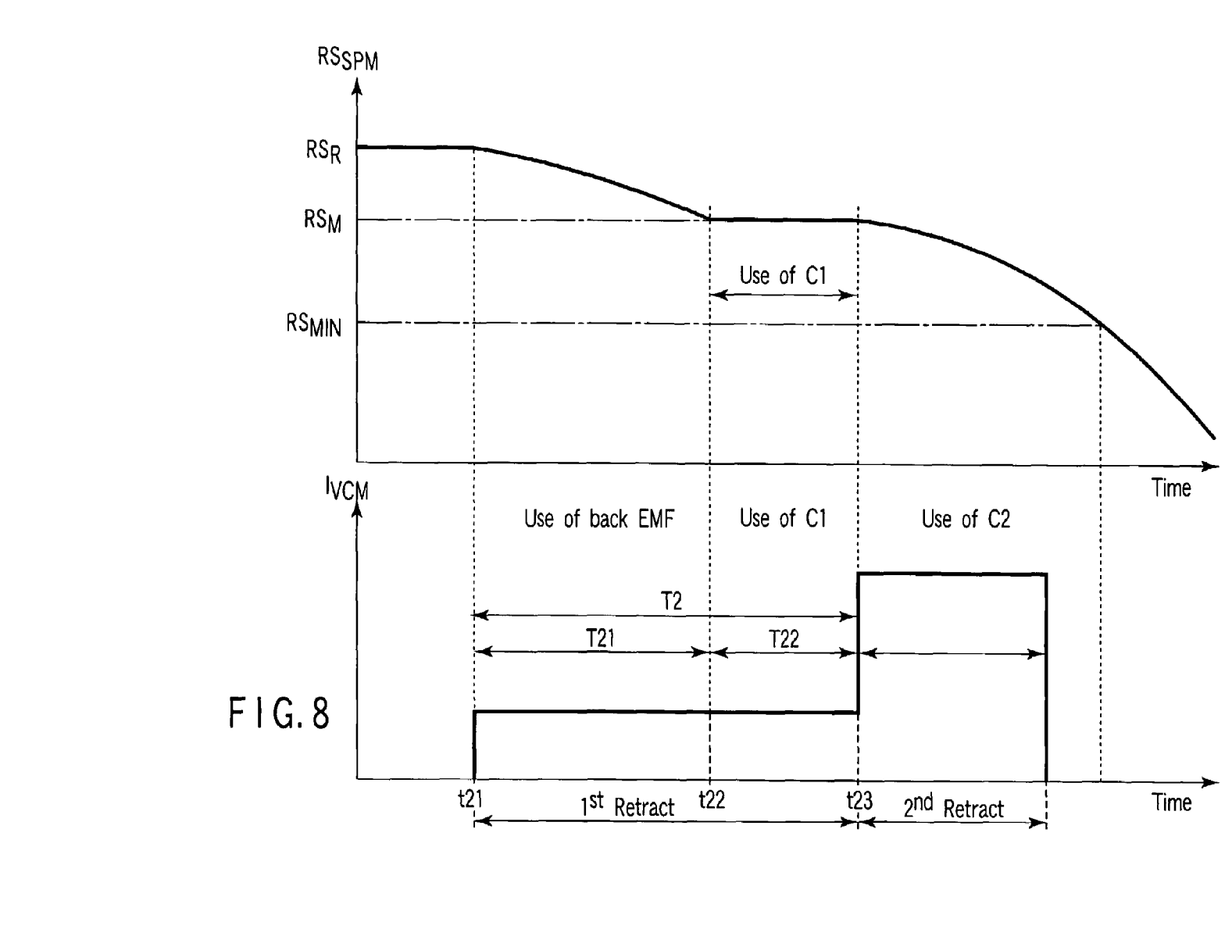
FIG. 8 is a view illustrating changes in the rotational speed $RS_{SPM}$ of an SPM 13 and a VCM current $I_{VCM}$ with respect to the period ranging from the time when interruption of power occurs, to the time when head retraction has been finished, which are detected in the modification of the embodiment.
Figure 9:
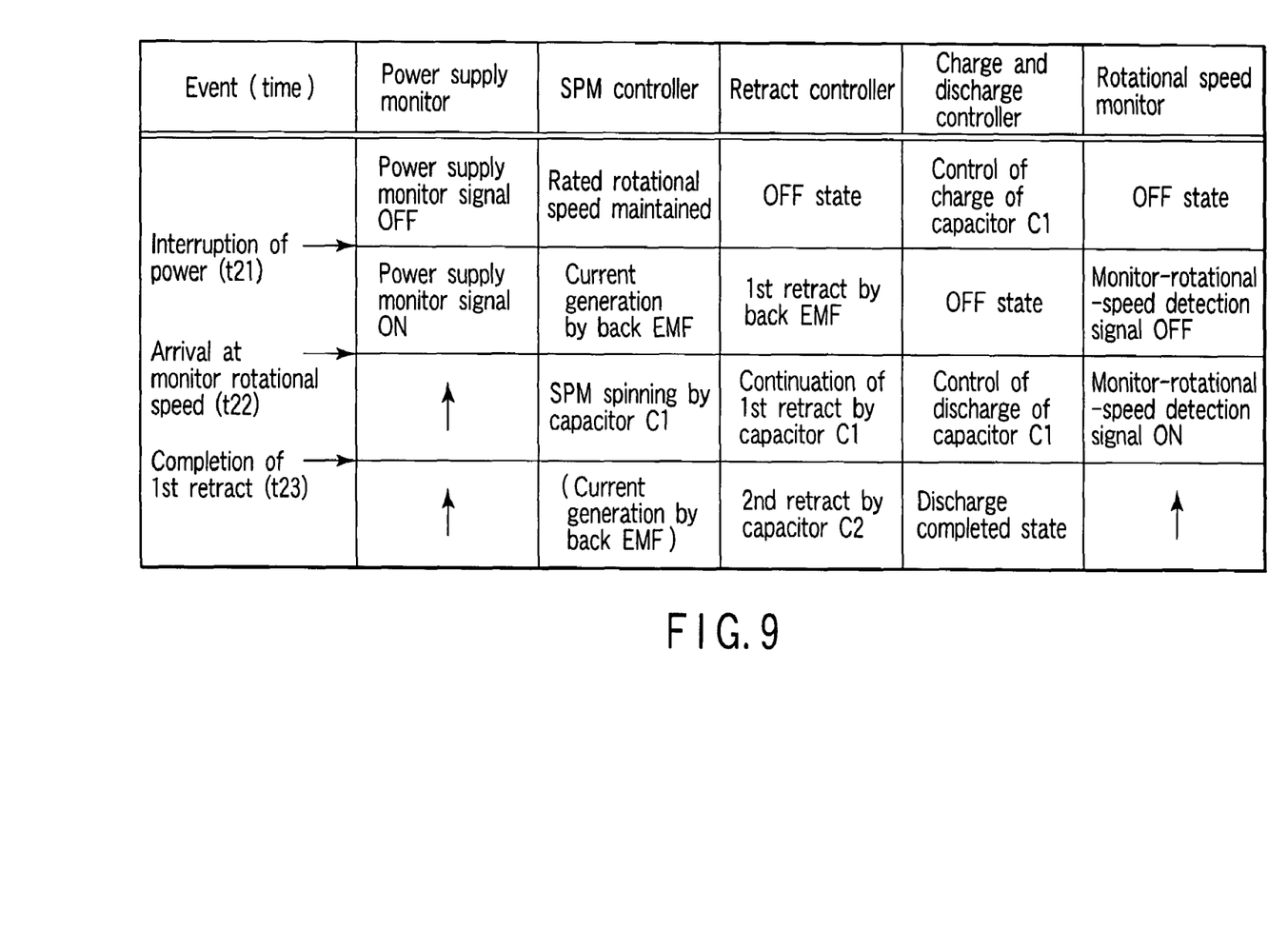
FIG. 9 is a view illustrating changes in the states of the circuits incorporated in the motor driver 28 in the modification of the embodiment.

Referring to FIGS. 8 and 9, the operation of the modification will be described. FIG. 8 shows changes in the rotational speed $RS_{SPM}$ of an SPM 13 and a VCM current $I_{VCM}$ with respect to the period ranging from the time when interruption of power occurs, to the time when head retraction has been finished. FIG. 9 shows changes in the states of the circuits incorporated in the motor driver 28.

Firstly, assume that the power supply monitor 183 has detected the interruption of power to the HDD at time t21. At this time, the power supply monitor 183 switches the power supply monitor signal 183a from low level to high level. When the power supply monitor signal 183a is shifted from low level to high level, the retract timer 182a of the retract controller 282 starts to measure the $1^{st}$ retract period set therein. Assume that the $1^{st}$ retract period is T2, and the retract switching position is the preset position over the outer periphery of the disk 11, as in the embodiment.

When the power supply monitor signal 183a is shifted to high level, the retract controller 282 starts to perform the $1^{st}$ retract operation ($1^{st}$ retract control operation), thereby supplying, to the VCM 15 as a VCM current, the current generated by the back EMF of the SPM 13 and supplied from the SPM controller 181. At this time, the VCM 15 moves the actuator 14 to retract the head 12 to the ramp 16.

The FET 184c of the charge and discharge controller 284 is still in the OFF state when the power supply monitor signal 183a is shifted to high level. Thus, even when the power supply monitor signal 183a is shifted to high level, and the retract controller 282 starts the $1^{st}$ retract operation, the discharge of the capacitor C1 is not started. In this case, no SPM current is supplied from the SPM controller 181 to the SPM 13, and the SPM 13 keeps spinning by inertia.

On the other hand, when the power supply monitor signal 183a is shifted to high level, the rotational speed monitor 285 monitors the rotational speed $RS_{SPM}$ of the SPM 13 based on the rotational speed signal 181a generated by the SPM controller 181. Assume here that the rotational speed $RS_{SPM}$ of the SPM 13 that is spinning by inertia from time t21 is reduced to the monitor rotational speed $RS_M$ at time t22, time 22 being different from time t21 by period T21 shorter than the $1^{st}$ retract period. At time t22, the rotational speed monitor 285 outputs the high-level monitor rotational-speed detection signal 285a.

The FET 184c of the charge and discharge controller 284 is turned ON in accordance with the output of the high-level monitor rotational-speed detection signal 285a. At this time, i.e., at time t22, the discharge of the SPM-powering capacitor C1 is started. As a result, the current resulting from the discharge of the capacitor C1 is supplied to the SPM controller 181 and retract controller 282 via the FET 184c and diode 184b.

The SPM controller 181 supplies, to the SPM 13 as an SPM current, the current (part of the current) supplied from the capacitor C1. As a result, the rotational speed $RS_{SPM}$ of the SPM 13 reduced to the monitor rotational speed $RS_M$ is kept, as far as possible, at the monitor rotational speed $RS_M$ after time t22 (see FIG. 8). Thus, the floating level of the head 12 can be prevented even after time t22 from becoming lower than a preset level. On the other hand, the retract controller 282 supplies, to the VCM 15 as a VCM current, the current (part of the current) supplied from the capacitor C1 when the monitor rotational-speed detection signal 285a becomes high at time 22. As a result, the $1^{st}$ retract operation is continued even after time t22.

As described above, in the modification of the embodiment, in period T21 ranging from time t21 at which the interruption of power to the HDD occurs, to time t22 at which the rotational speed $RS_{SPM}$ of the SPM 13 is reduced to the monitor rotational speed $RS_M$, the $1^{st}$ retract operation is performed using the back EMF of the SPM 13. After time t22, the $1^{st}$ retract operation is continued using the capacitor C1. The $1^{st}$ retract operation using the capacitor C1 is continued by period T22 ranging from time t22 to time t23 to which the $1^{st}$ retract period T2 ranges from time 21. Namely, the $1^{st}$ retract operation using the capacitor C1 is continued by period T22 ranging from time t22 to time t23 at which the timeout of the retract timer 182a occurs. When the timeout of the retract timer 182a occurs, the retract controller 282 starts the $2^{nd}$ retract operation using the $2^{nd}$ retract capacitor C2 as a VCM current source, as in the retract controller 182 employed in the embodiment. In other words, the retract controller 282 supplies, to the VCM 15 as a VCM current, the current supplied from the capacitor C2.

In the modification of the embodiment, it is assumed that the retract switching position is the preset position over the outer periphery of the disk 11. Alternatively, it may be another position, for example, a preset position on the retraction area of the ramp 16. To this end, it is sufficient if a capacitor having a greater electrostatic capacitance than the capacitor C1 of the modification is used. In this case, the rotational speed $RS_{SPM}$ of the SPM 13 is prevented from becoming lower than the lower-limit rotational speed $RS_{MIN}$, and the head 12 can be made to reach the retraction area of the ramp 16 or reach a position near the retraction area at time t23 later than time t22 by period T22. At time t23, a current is supplied to the VCM 15 by the $2^{nd}$ retract operation, and the support frame 143 of the actuator 14 is pushed against the outer-periphery stopper 17, with the head 12 shifted to the ramp 16. In this case, the $2^{nd}$ retract operation can be executed, using the back EMF of the SPM 13 instead of the $2^{nd}$ retract capacitor C2.

Figure 10:
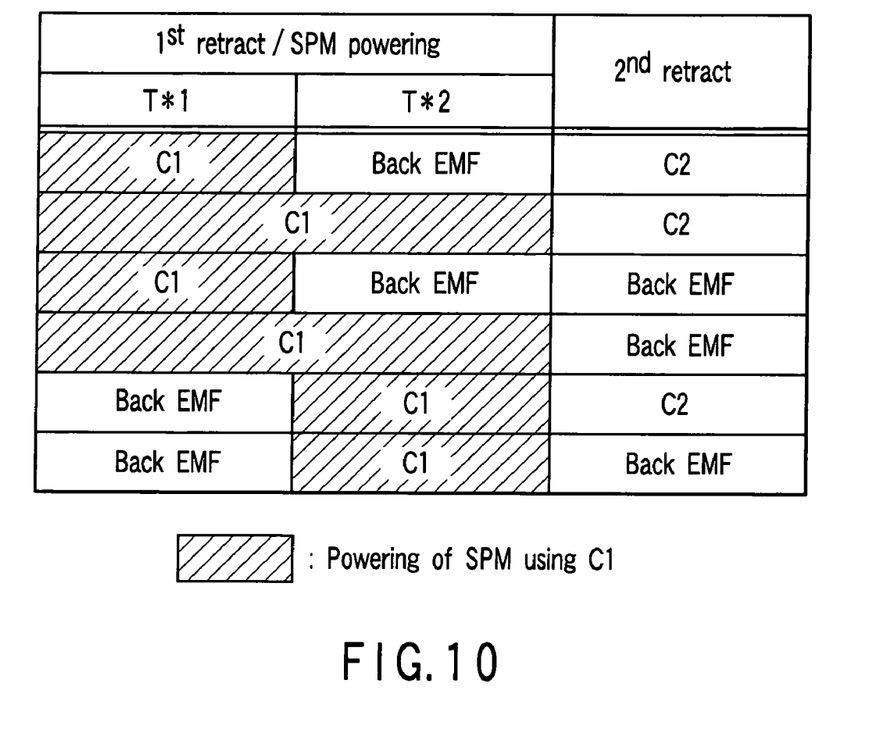
FIG. 10 is a matrix view illustrating how to combine VCM current sources for powering the VCM 15, along with information as to whether the SPM 13 is powered.

FIG. 10 illustrates how to combine VCM current sources for powering the VCM 15, described in the embodiment and its modification, along with information as to whether the SPM 13 is powered. In FIG. 10, T*1 and T*2 represent the initial part and remaining part of the $1^{st}$ retract period T* elapsing from the interruption of power, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of retracting a head to a ramp upon interruption of power to a disk drive, the head being used to read and write data from and to a disk when the disk is spun by a spindle motor, the ramp being located near the disk, comprising:
    supplying a current to the spindle motor upon the interruption of the power to the disk drive by using discharge of a capacitor charged with the power; and
    performing retract control for retracting the head to the ramp upon the interruption of the power, in which the retract control includes supplying a current to a voice coil motor which drives an actuator supporting the head by using the discharge of the capacitor.

2. The method according to claim 1, further comprising determining a retract period required to move the head from a present position thereof to a preset retract switching position when the disk drive is operating,
    and wherein the performing the retract control includes supplying a current to the voice coil motor, using one of discharge of another capacitor charged with the power, and a back electromotive force of the spindle motor, after the retract period elapses from the interruption of the power.

3. The method according to claim 2, wherein the performing the retract control includes supplying a current to the voice coil motor, using the discharge of the capacitor, during at least initial part of the retract period elapsing from the interruption of the power.

4. The method according to claim 3, wherein:
    an electrostatic capacitance of the capacitor is selected to a value sufficient for the discharge of the capacitor to be continued, and sufficient for the head to reach the retract switching position, at least until the retract period elapses; and
    the supplying the current to the voice coil motor using the discharge of the capacitor is executed until the retract period elapses.

5. The method according to claim 3, wherein when the discharge of the capacitor is completed before the retract period elapses from the interruption of the power, the performing the retract control includes supplying a current to the voice coil motor during remaining part of the retract period, using the back electromotive force of the spindle motor.

6. The method according to claim 2, wherein the performing the retract control includes:
    supplying a current to the voice coil motor during initial part of the retract period elapsing from the interruption of the power, using the back electromotive force of the spindle motor; and
    supplying a current to the voice coil motor during remaining part, except for the initial part, of the retract period elapsing from the interruption of the power, using the discharge of the capacitor.

7. The method according to claim 6, further comprising monitoring rotational speed of the spindle motor upon the interruption of the power to detect whether the rotational speed of the spindle motor decreases to a particular rotational speed, the particular rotational speed being higher than a preset lower-limit rotational speed and lower than a rated rotational speed of the spindle motor, the preset lower-limit rotational speed enabling a floating level of the head to be maintained at a lower-limit level,
    and wherein the supplying the current to the voice coil motor using the back electromotive force of the spindle motor is executed during a period, as the initial part, ranging from the interruption of the power to a time when the rotational speed of the spindle motor is detected to be reduced to the particular rotational speed.

8. A disk drive in which a head is used to read and write data from and to a disk, comprising:
    a spindle motor which spins the disk;
    an actuator which supports the head to enable the head to move radially over the disk;
    a voice coil motor which drives the actuator;
    a ramp located near the disk and used to retract the head thereto;
    a capacitor charged by a power supply to the disk drive;
    a power supply monitor configured to monitor a state of the power supply to detect interruption of power from the power supply to the disk drive;
    a charge and discharge controller configured to cause the capacitor to be charged by the power supply, and cause the capacitor to discharge in accordance with detection of the interruption of the power by the power supply monitor;
    a spindle motor controller configured to supply a current to the spindle motor in accordance with the detection of the interruption of the power by the power supply monitor by using discharge of the capacitor; and
    a retract cotroller configured to perform retract control for retracting the head to the ramp in accordance with the detection of the interruption of the power, the retract controller supplying, during the retract control, a current to the voice coil motor by using the discharge of the capacitor.

9. The disk drive according to claim 8, further comprising a backup power supply which enables the spindle motor controller and the retract controller to operate when supply of the power from the power supply to the disk drive is interrupted.

10. The disk drive according to claim 8, further comprising:
   another capacitor charged by the power supply to the disk drive; and
   a retract-period determination circuit which determines a retract period required to move the head from a present position thereof to a preset retract switching position when the disk drive is operating,
   and wherein the retract controller supplies a current to the voice coil motor, using discharge of said another capacitor, after the retract period elapses from the detection of the interruption of the power.

11. The disk drive according to claim 10, wherein the retract controller supplies a current to the voice coil motor, using the discharge of the capacitor, during at least initial part of the retract period elapsing from the detection of the interruption of the power.

12. The disk drive according to claim 11, wherein when the discharge of the capacitor is completed before the retract period elapses from the detection of the interruption of the power, the retract controller supplies a current to the voice coil motor during remaining part of the retract period, using the back electromotive force of the spindle motor.

13. The disk drive according to claim 10, wherein the retract controller supplies a current to the voice coil motor during initial part of the retract period elapsing from the detection of the interruption of the power, using the back electromotive force of the spindle motor, the retract controller supplying a current to the voice coil motor during remaining part, except for the initial part, of the retract period elapsing from the detection of the interruption of the power, using the discharge of the capacitor.

14. The disk drive according to claim 13, further comprising a rotational speed monitor which monitors rotational speed of the spindle motor upon the detection of the interruption of the power to detect whether the rotational speed of the spindle motor decreases to a particular rotational speed, the particular rotational speed being higher than a preset lower-limit rotational speed and lower than a rated rotational speed of the spindle motor, the preset lower-limit rotational speed enabling a floating level of the head to be maintained at a lower-limit level,
   and wherein the retract controller supplies the current to the voice coil motor, using the back electromotive force of the spindle motor, during a period, as the initial part, ranging from the detection of the interruption of the power to a time when the rotational speed monitor detects that the rotational speed of the spindle motor is reduced to the particular rotational speed.

15. The disk drive according to claim 14, further comprising a backup power supply which enables the spindle motor controller, the retract controller and the rotational speed monitor to operate when supply of the power from the power supply to the disk drive is interrupted.

16. The disk drive according to claim 8, further comprising a retract-period determination circuit which determines a retract period required to move the head from a present position thereof to a preset retract switching position when the disk drive is operating,
   and wherein the retract controller supplies a current to the voice coil motor, using a back electromotive force of the spindle motor, after the retract period elapses from the detection of the interruption of the power.

17. The disk drive according to claim 16, wherein the retract controller supplies a current to the voice coil motor, using the discharge of the capacitor, during at least initial part of the retract period elapsing from the detection of the interruption of the power.

18. The disk drive according to claim 17, wherein when the discharge of the capacitor is completed before the retract period elapses from the detection of the interruption of the power, the retract controller supplies a current to the voice coil motor during remaining part of the retract period, using the back electromotive force of the spindle motor.

19. The disk drive according to claim 16, wherein the retract controller supplies a current to the voice coil motor during initial part of the retract period elapsing from the detection of the interruption of the power, using the back electromotive force of the spindle motor, and supplies a current to the voice coil motor during remaining part, except for the initial part, of the retract period, using the discharge of the capacitor.

20. The disk drive according to claim 19, further comprising a rotational speed monitor which monitors rotational speed of the spindle motor upon the detection of the interruption of the power to detect whether the rotational speed of the spindle motor decreases to a particular rotational speed, the particular rotational speed being higher than a preset lower-limit rotational speed and lower than a rated rotational speed of the spindle motor, the preset lower-limit rotational speed enabling a floating level of the head to be maintained at a lower-limit level,
   and wherein the retract controller supplies the current to the voice coil motor, using the back electromotive force of the spindle motor, during a period, as the initial part, ranging from the detection of the interruption of the power to a time when the rotational speed monitor detects that the rotational speed of the spindle motor is reduced to the particular rotational speed.

* * * * *